United States Patent
Goodman et al.

(10) Patent No.: US 12,532,163 B2
(45) Date of Patent: Jan. 20, 2026

(54) ONBOARDING OF DEVICES IN DISTRIBUTED SYSTEMS USING WIRELESS NETWORKS

(71) Applicant: Dell Products L.P., Round Rock, TX (US)

(72) Inventors: Bradley K. Goodman, Nashua, NH (US); Joseph Caisse, Burlington, MA (US); Jerome A. Korthals, Round Rock, TX (US); Jenna Tartaglino, Needham, MA (US)

(73) Assignee: Dell Products L.P., Round Rock, TX (US)

( * ) Notice: Subject to any disclaimer, the term of this patent is extended or adjusted under 35 U.S.C. 154(b) by 403 days.

(21) Appl. No.: 18/362,907

(22) Filed: Jul. 31, 2023

(65) Prior Publication Data

US 2025/0048089 A1   Feb. 6, 2025

(51) Int. Cl.
| | |
|---|---|
| *H04L 29/06* | (2006.01) |
| *H04W 12/037* | (2021.01) |
| *H04W 12/06* | (2021.01) |
| *H04W 12/08* | (2021.01) |

(52) U.S. Cl.
CPC ......... *H04W 12/037* (2021.01); *H04W 12/06* (2013.01); *H04W 12/08* (2013.01)

(58) Field of Classification Search
None
See application file for complete search history.

(56) References Cited

U.S. PATENT DOCUMENTS

| | | | |
|---|---|---|---|
| 11,449,797 B1 | 9/2022 | Kurniawan | |
| 11,487,708 B1 | 11/2022 | Dangi | |
| 11,711,401 B2* | 7/2023 | Solari | H04L 63/0823 726/3 |
| 12,455,566 B2* | 10/2025 | Cristache | G06N 20/10 |
| 2009/0222674 A1 | 9/2009 | Leichsenring | |
| 2012/0173874 A1 | 7/2012 | Brown | |

(Continued)

OTHER PUBLICATIONS

Zarakovitis, Charilaos C. et al. Three-dimensional Access Point Assignment in Hybrid VLC, mmWave and WiFi Wireless Access Networks. ICC 2020—2020 IEEE International Conference on Communications (ICC). https://ieeexplore.ieee.org/stamp/stamp.jsp?tp=&arnumber=9148722 (Year: 2020).*

(Continued)

*Primary Examiner* — Jeremiah L Avery
(74) *Attorney, Agent, or Firm* — WOMBLE BOND DICKINSON (US) LLP (57) ABSTRACT

Methods and systems for managing onboarding of data processing systems are disclosed. To onboard the data processing systems, access information for wireless networks may be securely distributed to the data processing systems prior to being onboarded. The access information may be securely distributed using vouchers for the data processing systems. The vouchers may include information usable to secure distribution of the access information via wireless communication links to the data processing systems. The access information may allow the data processing systems to communication with rendezvous systems, orchestrators, and/or other entities that participate in the onboarding processes.

20 Claims, 6 Drawing Sheets

(56) References Cited

U.S. PATENT DOCUMENTS

| | | | |
|---|---|---|---|
| 2014/0086177 A1* | 3/2014 | Adjakple | H04W 74/04 370/329 |
| 2015/0032627 A1 | 1/2015 | Dill | |
| 2015/0310229 A1 | 10/2015 | Rohleder | |
| 2016/0164750 A1 | 6/2016 | Holkkola | |
| 2017/0041296 A1* | 2/2017 | Ford | G06F 21/64 |
| 2017/0272317 A1* | 9/2017 | Singla | H04L 41/0803 |
| 2017/0289060 A1 | 10/2017 | Aftab | |
| 2017/0302532 A1 | 10/2017 | Maes | |
| 2019/0014117 A1* | 1/2019 | Li | H04W 12/06 |
| 2019/0312857 A1* | 10/2019 | Lander | H04L 9/3271 |
| 2019/0364154 A1 | 11/2019 | Hermanek | |
| 2020/0084202 A1 | 3/2020 | Smith | |
| 2020/0244652 A1* | 7/2020 | Iyer | H04L 9/0637 |
| 2020/0275273 A1* | 8/2020 | Smith | H04W 12/50 |
| 2021/0112034 A1 | 4/2021 | Sundararajan | |
| 2021/0112411 A1* | 4/2021 | Pazhyannur | H04W 12/06 |
| 2021/0120408 A1* | 4/2021 | Pazhyannur | H04L 63/101 |
| 2021/0160231 A1* | 5/2021 | Kumar | H04L 63/0815 |
| 2021/0373905 A1 | 12/2021 | Sayyed | |
| 2022/0028505 A1 | 1/2022 | Colburn | |
| 2022/0240083 A1 | 7/2022 | Goel | |
| 2023/0412396 A1 | 12/2023 | Bommisetty | |
| 2024/0114342 A1* | 4/2024 | Jaskolski | H04W 12/06 |
| 2024/0388510 A1 | 11/2024 | Madtha | |
| 2025/0008379 A1 | 1/2025 | Lal | |
| 2025/0030561 A1 | 1/2025 | Long | |
| 2025/0062980 A1 | 2/2025 | Zhan | |
| 2025/0310179 A1* | 10/2025 | Pergament | H04L 63/0272 |
| 2025/0336409 A1* | 10/2025 | Hayun | G10L 25/48 |

OTHER PUBLICATIONS

Makris, Nikos et al. Service Orchestration Over Wireless Network Slices: Testbed Setup and Integration. IEEE Transactions on Network and Service Management, vol. 18, Issue: 1. https://ieeexplore.ieee.org/stamp/stamp.jsp?tp=&arnumber=9296280 (Year: 2020).*

Yang, Yunpeng et al. Opportunistic Wireless Internet Access in Vehicular Environments Using Enhanced WAVE Devices. Future Generation Communication and Networking (FGCN 2007). https://ieeexplore.ieee.org/stamp/stamp.jsp?tp=&arnumber=4426163 (Year: 2007).*

"BitLocker and Distributed Key Manager (DKM) for Encryption," Microsoft, Jul. 21, 2023, Web Page <https://learn.microsoft.com/en-us/purview/office-365-bitlocker-and-distributed-key-manager-for-encryption> accessed on Jul. 26, 2023 (2 Pages).

Banati et al., "Authentication and Authorization orchestrator for microservice-based software architectures", 2018 41st International Convention on Information and Communication Technology, Electronics and Microelectronics (MIPRO), retrieved from <https://ieeexplore.ieee.org/stamp/stamp.jsp?tp=&arnumber=8400214> on Oct. 20, 2025, pp. 1180-1184 (Year: 2018).

Kubovy et al., "A secure Token-based Communication for Authentication and Authorization Servers", International Conference on Future Data and Security Engineering, International Publishing, retrieved from <https://www.researchgate.net/publication/309365153> on Oct. 20, 2025, 16 pages (Year: 2016).

Nadeem et al., "A Case for Microservices Orchestration Using Workflow Engines", 2022 IEEE/ACM 44th International Conference on Software Engineering: New Ideas and Emerging Results, pp. 6-10 (Year: 2022).

* cited by examiner

ONBOARDING OF DEVICES IN DISTRIBUTED SYSTEMS USING WIRELESS NETWORKS

FIELD

Embodiments disclosed herein relate generally to managing device onboarding. More particularly, embodiments disclosed herein relate to systems and methods to onboard devices using wireless networks.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing performance of computer-implemented services. The computer-implemented services may be performed by any number of data processing systems throughout a distributed environment. Performance of the computer-implemented services may be managed and/or facilitated by an entity in a distributed environment, such as an orchestrator, a user device and/or any other data processing system (e.g., device).

Data processing systems added to the distributed environment may be onboarded prior to participating in the provision of the computer-implemented services. Onboarding data processing systems may require that the data processing systems have access to wireless networks prior to being onboarded.

To facilitate onboarding, access information may be securely distributed to the not-yet onboarded data processing systems. The access information be secured using information included in vouchers for the data processing systems. The information may include, for example, verification keys usable to verify responses to challenges, encryption/decryption keys usable to encrypt/decrypt data sent to and/or received from the data processing systems, and/or other types of information.

By doing so, the data processing systems may automatically join wireless network through which rendezvous systems, orchestrators, and/or other entities may be reached. Consequently, reduced levels of human intervention may be required to onboard data processing systems (e.g., when compared to establishing wired connections).

In an embodiment, a method of managing onboarding of data processing systems is provided. The method may include obtaining a voucher for a data processing system of the data processing systems prior to onboarding the data processing system; distributing, using information from the voucher, access information for a wireless network to the data processing system to establish a communication channel between the data processing system and an orchestrator via at least the wireless network; providing onboarding information to the data processing system using the communication channel; and onboarding the data processing system using the onboarding information.

Distributing the access information may include establishing a second channel between a communication manager and the data processing system via a direct communication link; issuing, via the second channel, a challenge to the data processing system; obtaining, via the second channel, a response; making a determination regarding whether the response is verifiable using the voucher; in a first instance of the determination where the response is verifiable: providing, via the second channel, the access information.

The second channel may be implemented using encryption.

Distributing the access information may include encrypting the access information using the voucher to obtain encrypted access information; and distributing the encrypted access information to the data processing system.

The access information may be encrypted using an encryption key for which the data processing system has access to a corresponding decryption key.

The encrypted access information may be distributed using a broadcast process.

The encrypted access information may be distributed using a unicast process using communication credentials for the data processing system from the voucher.

The voucher may be obtained from a voucher management system operated by a first entity, and the data processing system may be onboarded to a system maintained by a second entity.

The first entity may be a manufacturer or seller of the data processing system.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the method when the computer instructions are executed by the processor.

Figure 1:
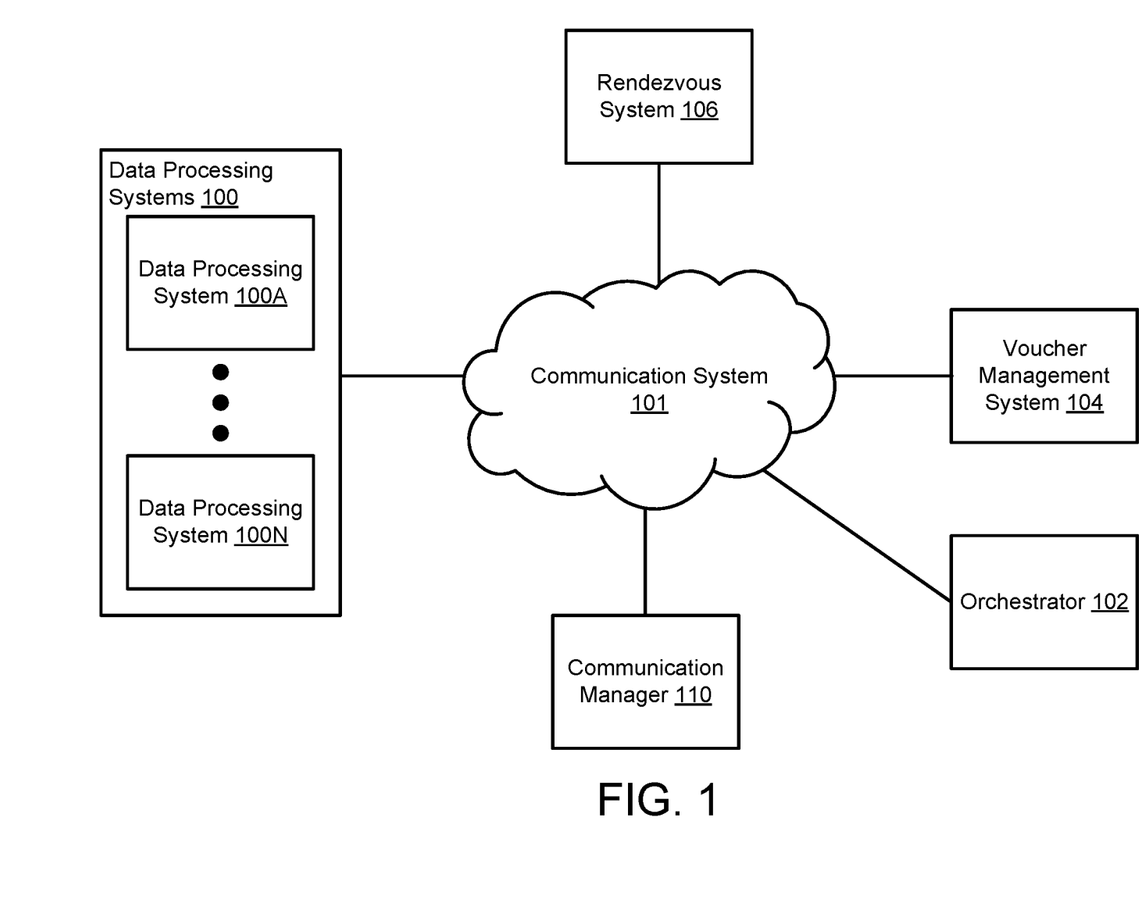
FIG. 1 shows a block diagram illustrating a system in accordance with an embodiment.

Turning to FIG. 1, a block diagram illustrating a system in accordance with an embodiment is shown. The system shown in FIG. 1 may provide computer-implemented services. The computer-implemented services may include any type and quantity of computer-implemented services. For example, the computer-implemented services may include data storage services, instant messaging services, database services, and/or any other type of service that may be implemented with a computing device.

To manage performance of the computer-implemented services, a distributed environment may include any number of data processing systems 100. Each data processing system of data processing systems 100 may be onboarded prior to participating in provision of the computer-implemented services. To onboard a data processing system of data processing systems 100 (e.g., data processing system 100A) an entity (e.g., a person/business that owns the data processing system) with authority over data processing systems 100 may obtain a voucher from voucher management system 104.

To obtain the voucher, the entity with authority over data processing systems 100 (e.g., a user) may present access credentials to voucher management system 104. The access credentials may include any authentication factor (e.g., a password, a pin, a biometric factor, a cryptographic token, etc.) usable to verify the identity and permissions of the user and/or designated device such as orchestrator 102.

Once obtained, the voucher may be used to direct a data processing system that has not been onboarded to orchestrator 102, which may manage the onboarding process. For example, a copy of and/or information from the voucher may be provided to rendezvous system 106. A new data processing system that has not been onboarded (e.g., after purchase from a manufacturer or reseller), may by default attempt to communicate with rendezvous system 106. By providing the information to rendezvous system 106, rendezvous system 106 may automatically direct the data processing system to orchestrator 102.

However, to do so, a data processing system may need to be able to communicate with rendezvous system 106 and orchestrator 102. In scenarios in which a new data processing system is obtained, the new data processing system may lack access credentials for wireless networks. Thus, when initially obtained and deployed to a particular location, the new data processing system may be unable to communicate with rendezvous system 106 and/or orchestrator 102.

In general, embodiments disclosed herein may provide methods, systems, and devices for onboarding data processing systems without (and/or with reduced levels of) user intervention. To onboard data processing systems without user intervention, access information (e.g., network names, passwords/other type of access credentials, etc.) for wireless network may be automatically distributed to new data processing systems that have not yet been onboarded. By doing so, the new data processing systems may be able to communicate with rendezvous servers, orchestrators, and/or other types of entities.

To distribute the access information, vouchers (e.g., ownership vouchers) for not yet onboarded data processing system may be generated in a manner so that secure communications for the data processing system may be automatically established. For example, when generated, in addition to including information usable by the data processing system to cryptographically verify that various authority over the data processing has been delegated, the ownership voucher may include cryptographic information (e.g., keys from key-pairs, symmetric keys, etc.) usable to (i) verify data processing systems and/or (ii) secure communications with the data processing systems. By doing so, access information for a wireless network may be securely distributed to not-yet onboarded data processing systems.

By doing so, embodiments disclosed herein may enable not-yet onboarded data processing systems to communicate using wireless networks while securing access information for the wireless network. Consequently, data processing systems may be onboarded without needing to establish wired connections to the data processing systems.

To provide the above noted functionality, the system may include data processing systems 100, orchestrator 102, voucher management system 104, rendezvous system 106, and communication manager 110. Each of these components is discussed below.

To provide the computer-implemented services, the system may include any number of data processing systems 100. For example, data processing systems 100 may include one data processing system (e.g., data processing system 100A) or multiple data processing systems (e.g., 100A-100N). Each data processing system of data processing systems 100 may include hardware and/or software components configured to provide the computer-implemented services. Data processing systems 100 may provide various computer-implemented services independently and/or cooperatively.

All, or a portion, of data processing systems 100 may provide (and/or participate in and/or support the) computer-implemented services to various computing devices operably connected to data processing systems 100. Different data processing systems may provide similar and/or different computer-implemented services. For example, data processing system 100N may be a new data processing system requiring onboarding to the distributed environment (via, for example, an interaction with rendezvous system 106, orchestrator 102, etc.).

Data processing systems 100 may be manufactured and/or owned by a first party, and provided (e.g., sold) to other parties for use in computer-implemented services. When provided to the other party, a voucher may be used to transfer control over a data processing system to the other party. To facilitate the transfer, each of data processing systems 100 may contact a rendezvous system (e.g., rendezvous system 106) by default. The rendezvous system may direct data processing systems 100 to orchestrator 102 for management.

Figure 2A:
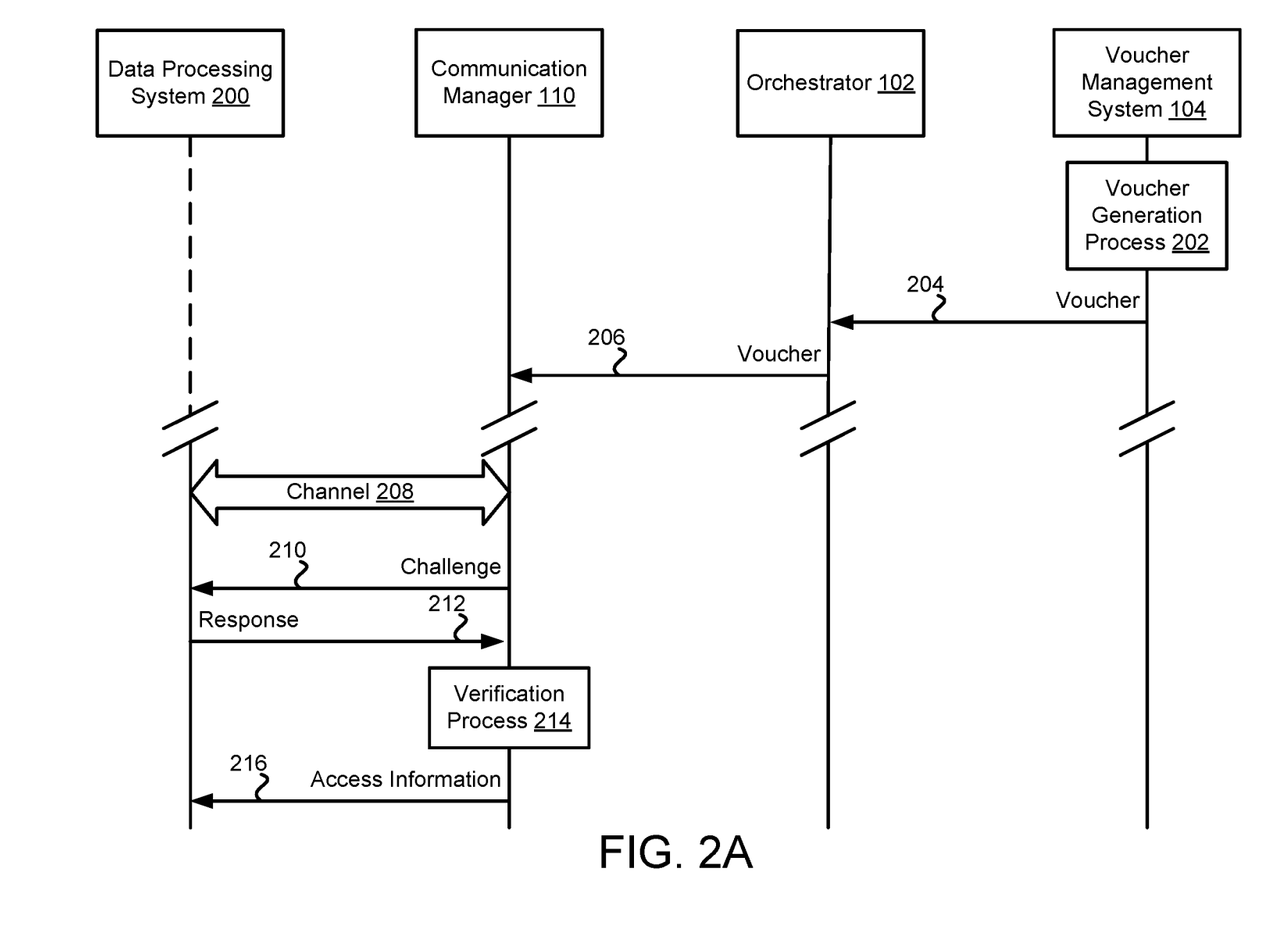
FIGS. 2A-2C show interaction diagrams in accordance with an embodiment.
Figure 2B:
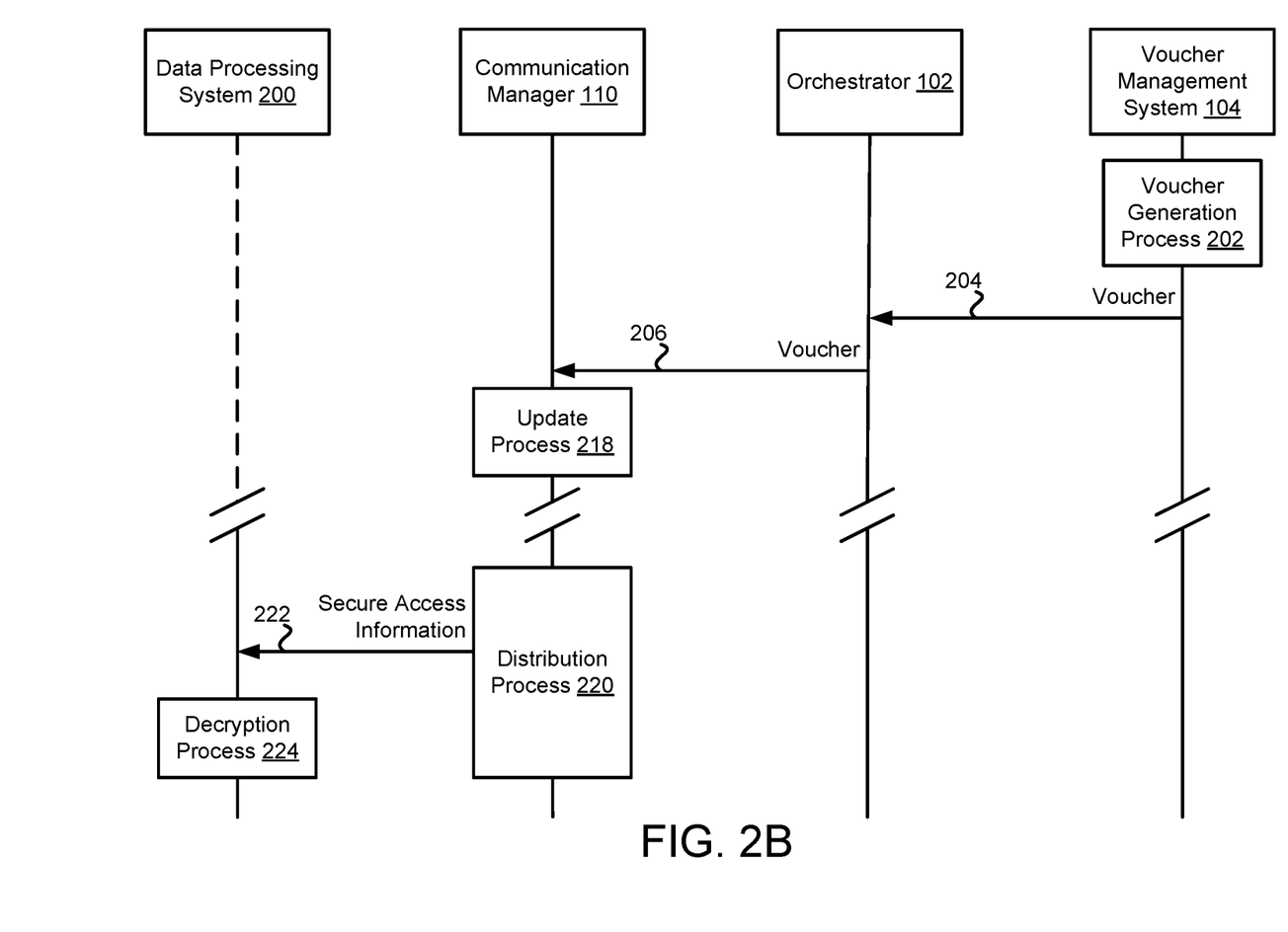

Voucher management system 104 may provide vouchers (e.g., including information usable to validate a root of trust and delegate authority over a data processing system to another entity) to entities with permissions to onboard and/or manage data processing systems 100. To provide its functionality, voucher management system 104 may generate vouchers dynamically as requested by orchestrator 102. When generated, the vouchers may include, for example, a public key usable to verify signatures generated using a device attestation key of a data processing system (e.g., which may be protected by a trusted platform module of the data processing system), a symmetric or asymmetric encryption key (e.g., which may be protected by a trusted platform module of the data processing system), and/or other types of data structures. Refer to FIGS. 2A-2B for additional details regarding voucher management.

Orchestrator 102 may onboard data processing systems to provide desired computer-implemented services. To onboard data processing systems, orchestrator 102 may onboard data processing systems. During onboarding, a data processing may be configured, may instantiate various software components, may establish accounts for various entities, and/or may perform other actions under the direction of orchestrator 102.

Figure 2C:
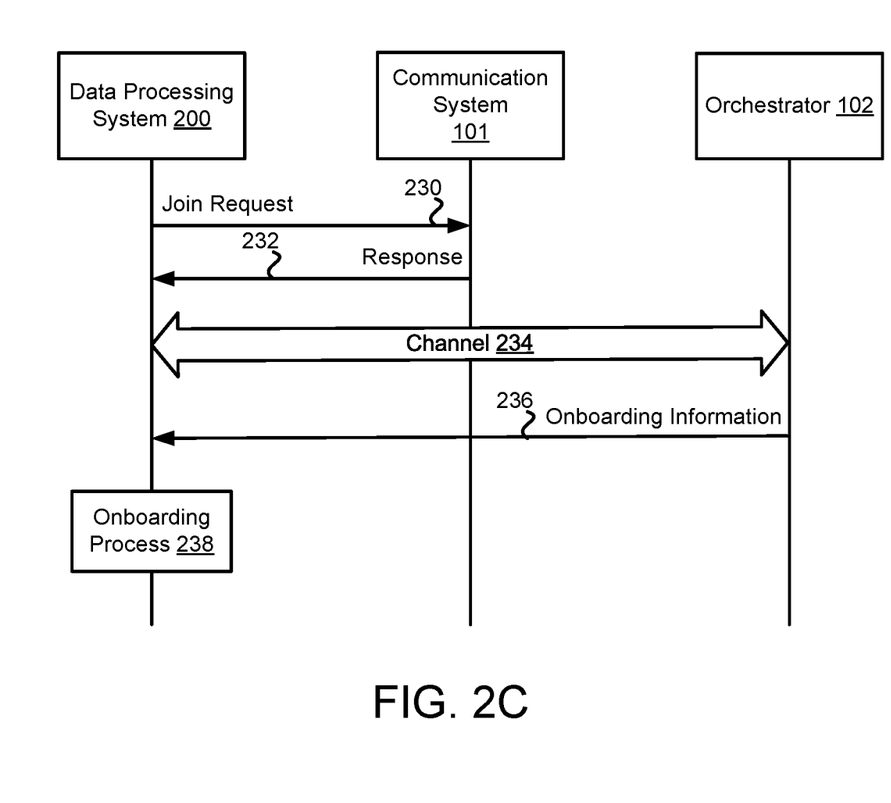

Additionally, to facilitate onboarding, orchestrator 102 may (i) obtain vouchers from voucher management system 104, and (ii) distribute the vouchers and/or information included in the vouchers to rendezvous system 106 and/or communication manager 110. Refer to FIGS. 2A-2C for additional details regarding operation of orchestrator 102.

Communication manager 110 may facilitate distribution of access information for wireless networks to to-be-onboarded data processing systems. To do so, communication manager may use information from vouchers to establish secure communications with the to-be-onboarded data processing systems. The access information may be provided to the to-be-onboarded data processing systems via the secure communications.

The secure communications may include (i) point to point communications, (ii) broadcast communications, and/or (iii) unicast communications. Refer to FIGS. 2A-2C for additional details regarding secure distribution of access information.

Figure 3:
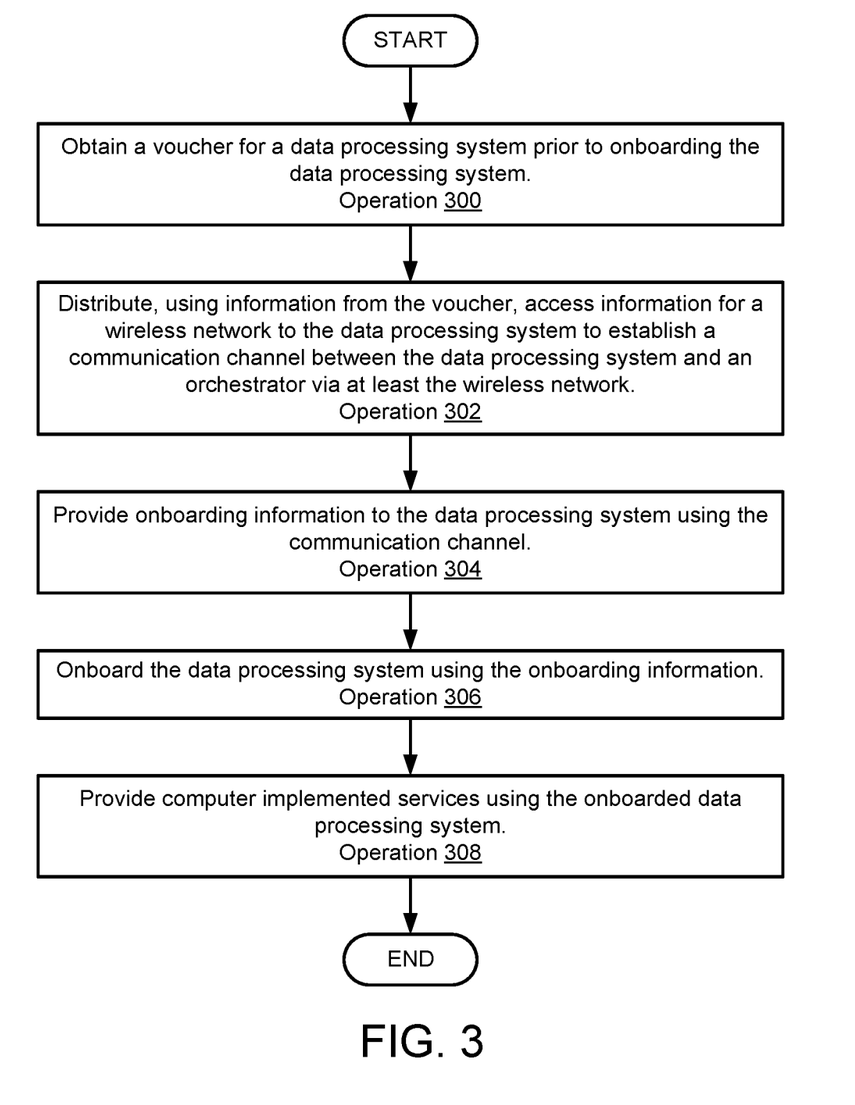
FIG. 3 shows a flow diagram illustrating a method of onboarding a data processing system in accordance with an embodiment.

When performing their functionality, data processing systems 100, orchestrator 102, voucher management system 104, rendezvous system 106, and/or communication manager 110 may perform all, or a portion, of the methods and/or actions shown in FIGS. 2A-3.

Data processing systems 100, orchestrator 102, voucher management system 104, rendezvous system 106, and/or communication manager 110 may be implemented using a computing device such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

While illustrated as being separate from other entities, the functionality of communication manager 110 may be performed by any of the other components of FIG. 1. For example, peer data processing system or orchestrator 102 may serve as communication manager 110.

Any of the components illustrated in FIG. 1 may be operably connected to each other (and/or components not illustrated) with a communication system 101. In an embodiment, communication system 101 may include one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

To further clarify embodiments disclosed herein, interactions diagrams in accordance with an embodiment are shown in FIGS. 2A-2C. These interactions diagrams may illustrate how data may be obtained and used within the system of FIG. 1.

In the interaction diagrams, processes performed by and interactions between components of a system in accordance with an embodiment are shown. In the diagrams, components of the system are illustrated using named rectangular boxes at the top of each figure. Lines descend from each of these boxes. Boxes superimposed over these lines may indicate processes performed by the corresponding component, and arrows between the descending lines indicate interactions between the components.

Generally, the processes and interactions are temporally ordered in an example order with time increasing from the top to the bottom of each page. For example, the interaction labeled as 204 may occur prior to the interaction labeled as 206. However, it will be appreciated that the processes and interactions may be performed in different orders, any may be omitted, and other processes or interactions may be performed without departing from embodiments disclosed herein.

Turning to FIG. 2A, a first interaction diagram in accordance with an embodiment is shown. FIG. 2A may illustrate a process for securely distributing access information for a wireless network to data processing system 200 in accordance with an embodiment.

Data processing system 200 may be a new data processing system (e.g., similar to data processing systems 100) that is to be onboarded to a system maintained by a first entity. For example, the system may be a data center operated by the first entity. The first entity may have purchased data processing system 200 from a second entity (e.g., a manufacturer, a reseller, etc.).

To enable data processing system 200 to be onboarded, voucher management system 104 may perform voucher generation process 202. During voucher generation process 202, a voucher may be generated that includes a key usable to verify signatures generated using a device attestation key for data processing system 200.

At interaction 204, the voucher may be provided to orchestrator 102. For example, the voucher may be generated and provided to orchestrator 102 in response to a request (not shown) for the voucher from orchestrator 102.

At interaction 206, the voucher may be provided to communication manager 110.

In FIG. 2A, the line descending from data processing system 200 is drawn in dashing to indicate, for example, that data processing system 200 may not yet have arrived at a site maintained for the first entity and which has access to a wireless network.

Once data processing system 200 arrives at the site, communication manager 110 may establish channel 208 to data processing system 200. Channel 208 may be establishing using a direct communication link. For example, the direct communication link may be implemented using near field communications, bluetooth communications, or other types of direct wireless communication link.

In an embodiment, channel 208 is encrypted. For example, a key exchange process may be performed to establish a session key. The session key may be used to encrypt communications over channel 208. Alternatively, channel 208 may be encrypted using a symmetric or asymmetric encryption key (e.g., from the voucher, and a copy/counterpart of/for which may be protected by the trusted platform module of data processing system 200).

At interaction 210, communication manager 110 may generate and send a challenge to data processing system 200 via channel 208. The challenge may demand that a cryptographically verifiable response be provided.

At interaction 212, data processing system 200 generates and sends a response. The response may include a signature generated by a device attestation key of data processing system (e.g., protected by the trusted platform module).

Once the response is obtained, communication manager 110 may perform verification process 214. During verification process, the signature from the response may attempt to be verified using verification keys included in the voucher. For example, the voucher may include a public key for the device attestation key.

If the signature in the response can be verified, then communication manager 110 may, at interaction 216, distribute access information for the wireless network to data processing system 200 via channel 208.

Thus, via the method shown in FIG. 2A, access information usable to join a wireless network may be automatically distributed to a not-yet onboarded data processing system. The access information may be used to complete onboarding, as discussed with respect to FIG. 2C, below.

Turning to FIG. 2B, a second interaction diagram in accordance with an embodiment is shown. FIG. 2B may illustrate a process for securely distributing access information for a wireless network to data processing system 200 in accordance with an embodiment.

As seen in FIG. 2B, a voucher may be generated and distributed to communication manager 110 via interactions 204-206, as describe above with respect to FIG. 2A.

Once obtained by communication manager 110, update process 218 may be performed. During update process, communication manager 110 may update the manner in which it distributes access information via broadcast and/or unicast communications.

To update the manner in which it distributed information, communication manager 110 may encrypt a copy of access information for a wireless network using an encryption key from the voucher. Data processing system 200 may have a copy of the decryption key for the encryption key (e.g., may be symmetric or asymmetric).

Additionally, communication manager 110 may add the encrypted copy of the access information to a distribution schedule. The distribution schedule may specify when communication manager 110 will broadcast or unicast the encrypted copy of the access information. Additionally, the distribution schedule may specify the type of distribution to be attempted (e.g., broadcast/unicast). If unicast, the distribution schedule may also include an address (e.g., media access control address) for data processing system, which may be included in the obtained voucher.

In FIG. 2A, the line descending from data processing system 200 is drawn partially in dashing to indicate, for example, that data processing system 200 may not yet have arrived at a site maintained for the first entity and which has access to a wireless network.

Once update process 218 is complete, distribution process 220 may be updated to begin distributing the encrypted copy of the access information. During distribution process 220, broadcasts and/or unicasts of various encrypted copies of access information for the wireless network may be made to attempt to distribute it to corresponding data processing systems. Because the access information is encrypted and only decryptable by corresponding data processing system, secure access information may be distributed with reduced risk of inadvertent disclosure to unauthorized entities.

At operation 222, secure access information (e.g., the encrypted access information) is distributed to data processing system 200 via broadcast or unicast. Once distributed, data processing system 200 may perform decryption process 224 to decrypt the encrypted access information, thereby obtaining the access information for the wireless network.

Thus, via the method shown in FIG. 2B, access information usable to join a wireless network may be automatically distributed to any number of not-yet onboarded data processing systems. For example, overtime various vouchers may be distributed to communication manager 110 which may update distribution process 220 to facilitate secure distribution of access information to the to-be-onboarded data processing systems. Once the access information is securely distributed, distribution process 220 may be updated so that the secure access information is no longer broadcast/unicast. The access information may be used to complete onboarding, as discussed with respect to FIG. 2C, below.

Turning to FIG. 2C, a third interaction diagram in accordance with an embodiment is shown. FIG. 2C may illustrate a process for onboarding a data processing system via communications supported by a wireless network in accordance with an embodiment.

At interaction 230, data processing system 200 may use the previously obtained access information to send a join request to a device of communication system 101 that supports a wireless network. The join request may include credentials and/or other information from the access information.

At interaction 232, communication system 101 sends a response. If the credentials and/or other information in the join request are valid, the response may facilitate use of the wireless network by data processing system 200 (e.g., may include various keys, network information, etc.). Otherwise, the response may indicate that access to the wireless network is denied.

Presuming that the response is positive, channel 234 may be established. Channel 234 may be between data processing system 200 and orchestrator 102, and may utilize the wireless network. While not shown, it will be appreciated that similar channels may be established to a rendezvous server system (e.g., 106), which may direct data processing system 200 to orchestrator 102.

At interaction 236, orchestrator 102 distributes onboarding information to data processing system 200 via channel 234. The onboarding information may include information regarding configuration settings, software components to instantiate, accounts to be established, and/or other types of actions to be performed by data processing system 200 to place it in condition to participate in computer implemented services in accordance with various expectations of users of data processing system 200.

Once obtained, data processing system 200 may be use the onboarding information to perform onboarding process 238. During onboarding process, data processing system 200 may modify its operation based on the onboarding information.

Once onboarding process 238 is complete, data processing system 200 may provide desired computer implemented services.

Thus, using the method shown in FIG. 2C, embodiments disclosed herein may facilitate onboarding of data processing systems and through which desired computer implemented services may be obtained.

As discussed above, the components of FIG. 1 may perform various methods to manage onboarding of devices. FIG. 3 illustrates methods that may be performed by the components of FIG. 1. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method of revoking a voucher usable to onboard a data processing system in accordance with an embodiment is shown. The method may be performed, for example, by a voucher management service, an orchestrator, a data processing system, a rendezvous system, a communication manager, and/or any other entity of the system of FIG. 1.

At operation 300, a voucher for a data processing system is obtained. The voucher may be obtained prior to onboarding. The voucher may be obtained by generating the voucher, receiving the voucher from another device (e.g., a voucher management system), and/or reading the voucher from storage. The voucher may include information usable to secure communications with the data processing system.

At operation 302, access information for a wireless network is distributed to the data processing system using information from the voucher. The access information may be distributed by (i) establishing direct wireless link (e.g., near field communication, bluetooth, etc.) to the data processing system, verifying the data processing system (e.g., via challenge/response), and providing the access information via the direct wireless link if verified, and/or (ii) encrypting the access information using an encryption key that is decryptable using a decryption key maintained by the data processing system and broadcasting or unicasting the encrypted access information to the data processing system.

The access information may be used to establish a communication channel between the data processing system and an orchestrator. For example, the data processing system may use the access information to join a wireless network, and through which a channel to the orchestrator and/or rendezvous system may be established.

At operation 304, onboarding information is provided to the data processing system via the communication channel. The onboarding information may be provided by sending the onboarding information to the data processing system using, at least in part, the wireless network joinable using the access information.

At operation 306, the data processing system is onboarded using the onboarding information. The data processing system may be onboarded by performing onboarding actions indicated by the onboarding information. The onboarding actions may include any of (i) updating configuration settings, (ii) changing a software component loadout of the data processing system by adding/removing software components, (iii) establishing various accounts for user/administrators, and/or (iv) performing other actions to place the data processing system into condition to provide desired computer implemented services.

At operation 308, computer implemented services are provided using the onboarded data processing system. The computer implemented services may be provided, for example, by having the data processing system perform various actions as specified by the installed software components and/or user that may utilize it via the established accounts.

The method may end following operation 308.

Figure 4:
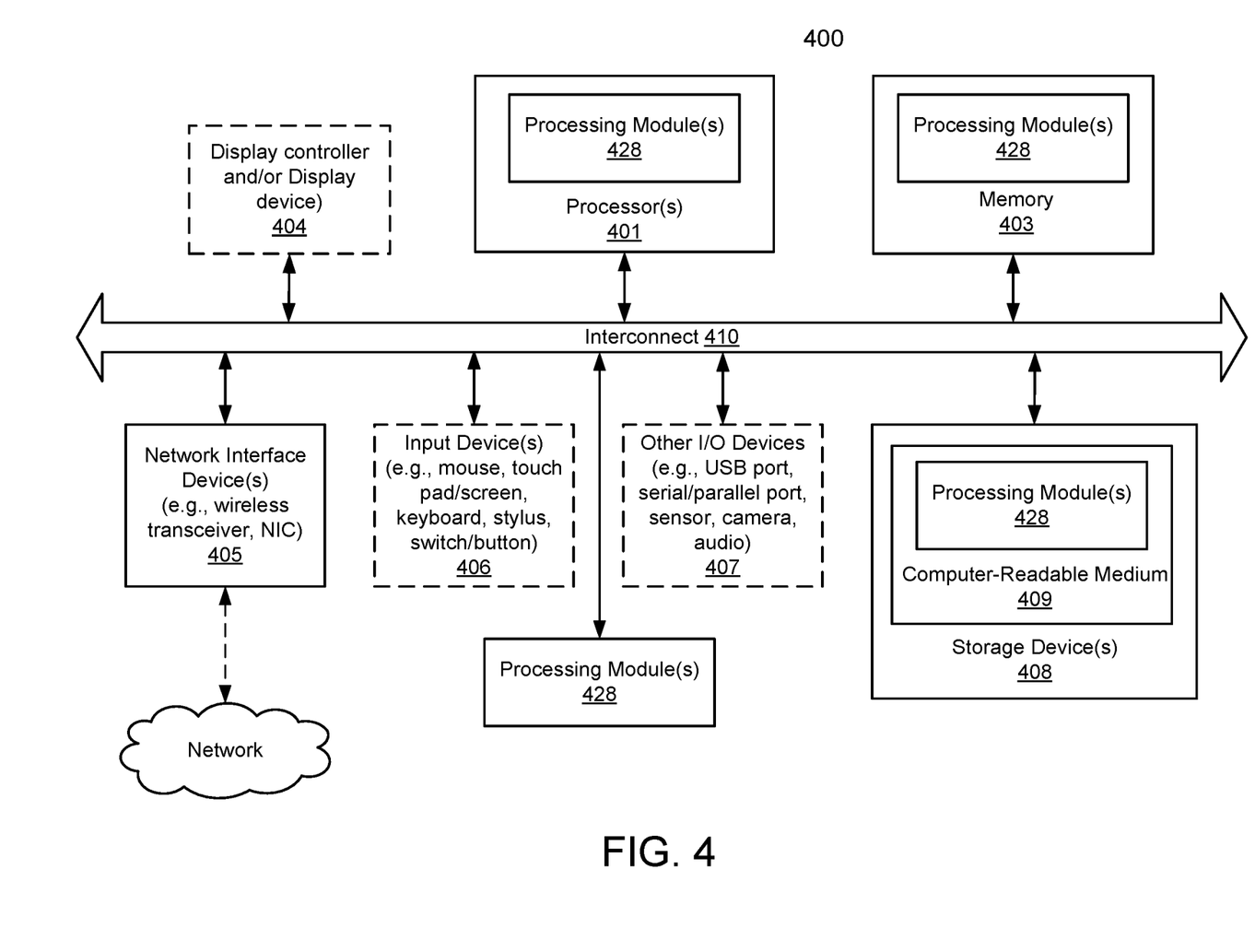
FIG. 4 shows a block diagram illustrating a data processing system in accordance with an embodiment.

Any of the components illustrated in FIGS. 1-2C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method of managing onboarding of data processing systems, the method comprising:
    obtaining a voucher for a data processing system of the data processing systems prior to onboarding the data processing system;
    distributing, using information from the voucher, access information for a wireless network to the data processing system to establish a communication channel between the data processing system and an orchestrator via at least the wireless network;
    providing onboarding information to the data processing system using the communication channel; and
    onboarding the data processing system using the onboarding information.

2. The method of claim 1, wherein distributing the access information comprises:
    establishing a second channel between a communication manager and the data processing system via a direct communication link;
    issuing, via the second channel, a challenge to the data processing system;
    obtaining, via the second channel, a response;
    making a determination regarding whether the response is verifiable using the voucher; and
    in a first instance of the determination where the response is verifiable:
        providing, via the second channel, the access information.

3. The method of claim 2, wherein the second channel is implemented using encryption.

4. The method of claim 1, wherein distributing the access information comprises:
    encrypting the access information using the voucher to obtain encrypted access information; and
    distributing the encrypted access information to the data processing system.

5. The method of claim 4, wherein the access information is encrypted using an encryption key for which the data processing system has access to a corresponding decryption key.

6. The method of claim 4, wherein the encrypted access information is distributed using a broadcast process.

7. The method of claim 4, wherein the encrypted access information is distributed using a unicast process using communication credentials for the data processing system from the voucher.

8. The method of claim 1, wherein the voucher is obtained from a voucher management system operated by a first entity, and the data processing system being onboarded to a system maintained by a second entity.

9. The method of claim 8, wherein the first entity is a manufacturer or seller of the data processing system.

10. A non-transitory machine-readable medium having instructions stored therein, which when executed by a processor, cause operations for managing onboarding of data processing systems to be performed, the operations comprising:
    obtaining a voucher for a data processing system of the data processing systems prior to onboarding the data processing system;
    distributing, using information from the voucher, access information for a wireless network to the data processing system to establish a communication channel between the data processing system and an orchestrator via at least the wireless network;
    providing onboarding information to the data processing system using the communication channel; and
    onboarding the data processing system using the onboarding information.

11. The non-transitory machine-readable medium of claim 10, wherein distributing the access information comprises:
    establishing a second channel between a communication manager and the data processing system via a direct communication link;
    issuing, via the second channel, a challenge to the data processing system;
    obtaining, via the second channel, a response;
    making a determination regarding whether the response is verifiable using the voucher; and
    in a first instance of the determination where the response is verifiable:
        providing, via the second channel, the access information.

12. The non-transitory machine-readable medium of claim 11, wherein the second channel is implemented using encryption.

13. The non-transitory machine-readable medium of claim 10, wherein distributing the access information comprises:
  encrypting the access information using the voucher to obtain encrypted access information; and
  distributing the encrypted access information to the data processing system.

14. The non-transitory machine-readable medium of claim 13, wherein the access information is encrypted using an encryption key for which the data processing system has access to a corresponding decryption key.

15. The non-transitory machine-readable medium of claim 13, wherein the encrypted access information is distributed using a broadcast process.

16. The non-transitory machine-readable medium of claim 13, wherein the encrypted access information is distributed using a unicast process using communication credentials for the data processing system from the voucher.

17. The non-transitory machine-readable medium of claim 10, wherein the voucher is obtained from a voucher management system operated by a first entity, and the data processing system being onboarded to a system maintained by a second entity.

18. The non-transitory machine-readable medium of claim 17, wherein the first entity is a manufacturer or seller of the data processing system.

19. A management system, comprising:
  a processor; and
  a memory coupled to the processor to store instructions which when executed by the processor cause operations for managing onboarding of data processing systems to be performed, the operations comprising:
    obtaining a voucher for a data processing system of the data processing systems prior to onboarding the data processing system;
    distributing, using information from the voucher, access information for a wireless network to the data processing system to establish a communication channel between the data processing system and an orchestrator via at least the wireless network;
    providing onboarding information to the data processing system using the communication channel; and
    onboarding the data processing system using the onboarding information.

20. The management system of claim 19, wherein distributing the access information comprises:
  establishing a second channel between a communication manager and the data processing system via a direct communication link;
  issuing, via the second channel, a challenge to the data processing system;
  obtaining, via the second channel, a response;
  making a determination regarding whether the response is verifiable using the voucher; and
  in a first instance of the determination where the response is verifiable:
    providing, via the second channel, the access information.

* * * * *